(12) United States Patent
Li et al.

(10) Patent No.: US 11,184,630 B2
(45) Date of Patent: Nov. 23, 2021

(54) METHOD AND APPARATUS FOR VIDEO CODING

(71) Applicant: Tencent America LLC, Palo Alto, CA (US)

(72) Inventors: Xiang Li, Saratoga, CA (US); Xiaozhong Xu, State College, PA (US); Shan Liu, Los Gatos, CA (US)

(73) Assignee: Tencent America LLC, Palo Alto, CA (US)

(*) Notice: Subject to any disclaimer, the term of this patent is extended or adjusted under 35 U.S.C. 154(b) by 87 days.

(21) Appl. No.: 16/506,450

(22) Filed: Jul. 9, 2019

(65) Prior Publication Data
US 2020/0107035 A1 Apr. 2, 2020

Related U.S. Application Data

(60) Provisional application No. 62/739,147, filed on Sep. 28, 2018.

(51) Int. Cl.
*H04N 19/44* (2014.01)
*H04N 19/51* (2014.01)

(52) U.S. Cl.
CPC ............. *H04N 19/44* (2014.11); *H04N 19/51* (2014.11)

(58) Field of Classification Search
CPC .............................. H04N 19/44; H04N 19/51
USPC ..................................................... 375/240.16
See application file for complete search history.

(56) References Cited

U.S. PATENT DOCUMENTS 8,787,460 B1 * 7/2014 Hobbs ................. H04N 19/176
375/240.16
2016/0269732 A1 * 9/2016 Li ......................... H04N 19/154

OTHER PUBLICATIONS

High Efficiency Video Coding, Rec. ITU-T H.265v4, Dec. 2016.
B. Bross, J. Chen, S. Liu, "Versatile Video Coding (Draft 2)", ISO/IEC JTC1/SC29/WG11 JVET-K1001, Jul. 2018.
H. Yang, S. Liu, K. Zhang, "Description of Core Experiment 4 (CE4): Inter prediction and motion vector coding", ISO/IEC JTC1/SC29/WG11 JVET-J1024, Jul. 2018.

* cited by examiner

*Primary Examiner* — Nguyen T Truong
(74) *Attorney, Agent, or Firm* — Oblon, McClelland, Maier & Neustadt, L.L.P.

(57) ABSTRACT

Aspects of the disclosure provide a method and an apparatus for video decoding. Processing circuitry of the apparatus decodes prediction information of a current block from a coded video bitstream. The prediction information indicates an inter prediction mode. The processing circuitry calculates at least one hash value based on motion information of a previously decoded block and determines whether the motion information is different from one or more motion information candidates in a candidate list for the current block based on the at least one hash value of the previously decoded block and at least one hash value of each of the one or more motion information candidates. The processing circuitry adds the motion information to the candidate list when the motion information is different from the one or more motion information candidates and reconstructs at least one sample of the current block based on the candidate list.

20 Claims, 11 Drawing Sheets

METHOD AND APPARATUS FOR VIDEO CODING

INCORPORATION BY REFERENCE

This present disclosure claims the benefit of priority to U.S. Provisional Application No. 62/739,147, "Hash Based Motion Vector Comparison and Pruning" filed on Sep. 28, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry decodes prediction information of a current block to be reconstructed from a coded video bitstream where the prediction information is indicative of an inter prediction mode. The processing circuitry calculates at least one hash value based on motion information of a previously decoded block and determines whether the motion information of the previously decoded block is different from one or more motion information candidates in a candidate list for the current block based on the at least one hash value of the previously decoded block and at least one hash value of each of the one or more motion information candidates. The processing circuitry adds the motion information of the previously decoded block to the candidate list as a new motion information candidate when the motion information of the previously decoded block is different from the one or more motion information candidates. The processing circuitry also reconstructs at least one sample of the current block based on current motion information of the current block that is determined based on the candidate list.

In an embodiment, the processing circuitry calculates the at least one hash value of the previously decoded block based on at least one motion vector in the motion information. In an example, the processing circuitry calculates the at least one hash value of the previously decoded block based on at least one of: reference picture number information, weighting information used in a generalized bi-directional prediction mode, local illumination compensation information, and prediction mode information for the previously decoded block.

In an embodiment, the previously decoded block is a first coding block including first sub-blocks and the motion information includes first multiple pieces of motion information for the first sub-blocks. The processing circuitry calculates a first hash value based on the first multiple pieces of motion information where the at least one hash value of the previously decoded block is the first hash value. In an example, the first multiple pieces of motion information are identical. In an example, the processing circuitry calculates the first hash value based on positions of the first sub-blocks in the previously decoded block.

In an embodiment, the processing circuitry calculates one of the at least one hash value of the previously decoded block from the motion information by at least one of: 1) setting an initial hash value of the one of the at least one hash value to be a non-zero number and 2) adding an offset to a number corresponding to one of: the at least one motion vector, the reference picture number information, the weighting information, the local illumination compensation information, and the prediction mode information for the previously decoded block. In an example, at least one of: the non-zero number and the offset is a prime number.

In an embodiment, one of the one or more motion information candidates includes second multiple pieces of motion information for second sub-blocks in a second coding block where the at least one hash value of the one of the one or more motion information candidates is a second hash value. The processing circuitry determines whether the first multiple pieces of motion information are different from the second multiple pieces of motion information based on the first hash value and the second hash value.

In an embodiment, the processing circuitry calculates a first hash value based on the motion information where the at least one hash value of the previously decoded block is the first hash value.

In an embodiment, the previously decoded block is coded in an affine prediction mode and includes first control points having first multiple pieces of motion information. One of the one or more motion information candidates corresponds to a second coding block coded in the affine prediction mode and having second control points where the second control points have second multiple pieces of motion information and the at least one hash value of the one of the one or more motion information candidates includes second hash values. A number of the first control points is equal to a number of the second control points. The processing circuitry calculates first hash values for the first control points, respectively and determines whether the first multiple pieces of motion information are different from the second multiple pieces of motion information based on the first hash values and the second hash values.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

Inter prediction figure

DETAILED DESCRIPTION OF EMBODIMENTS

Figure 2:
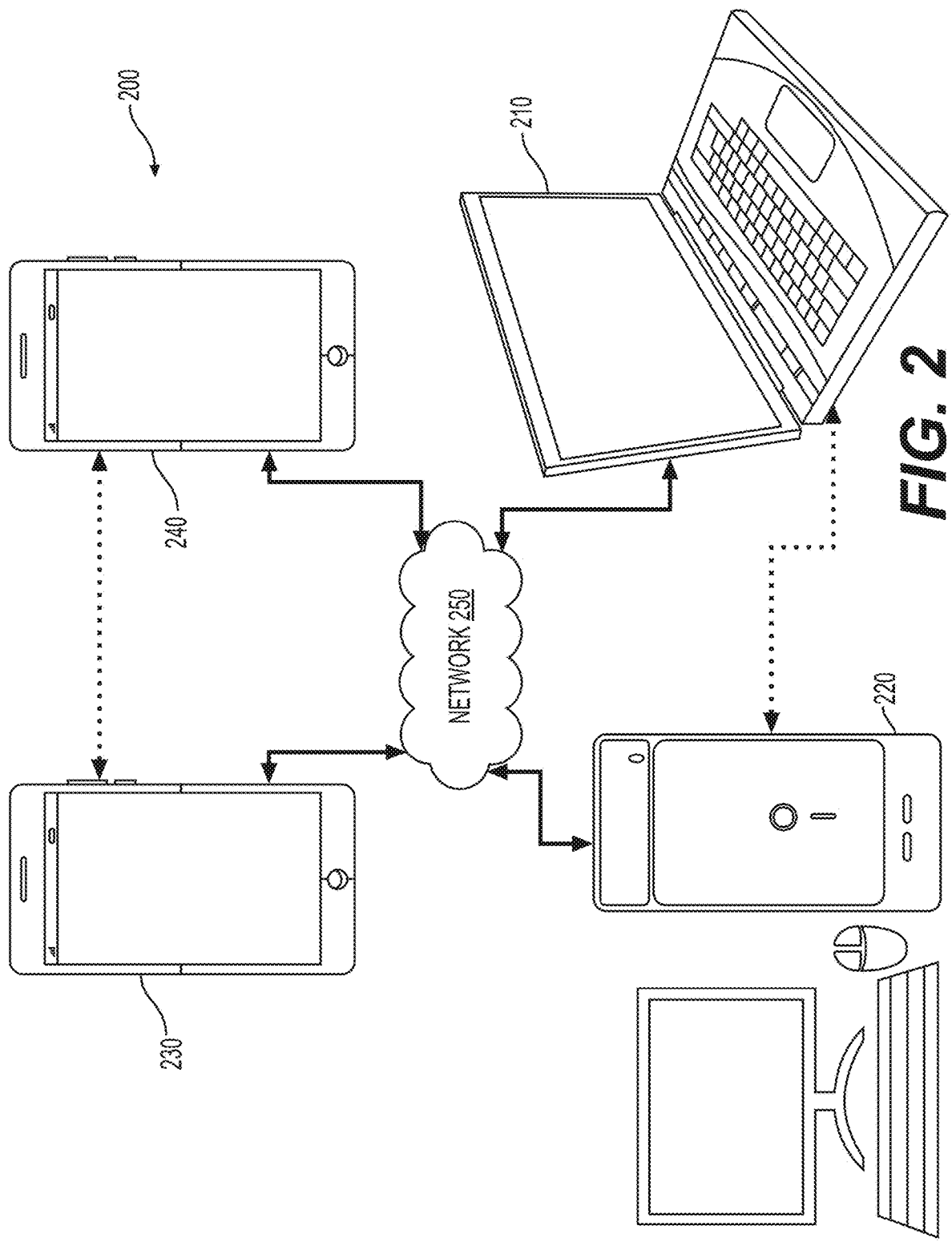
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
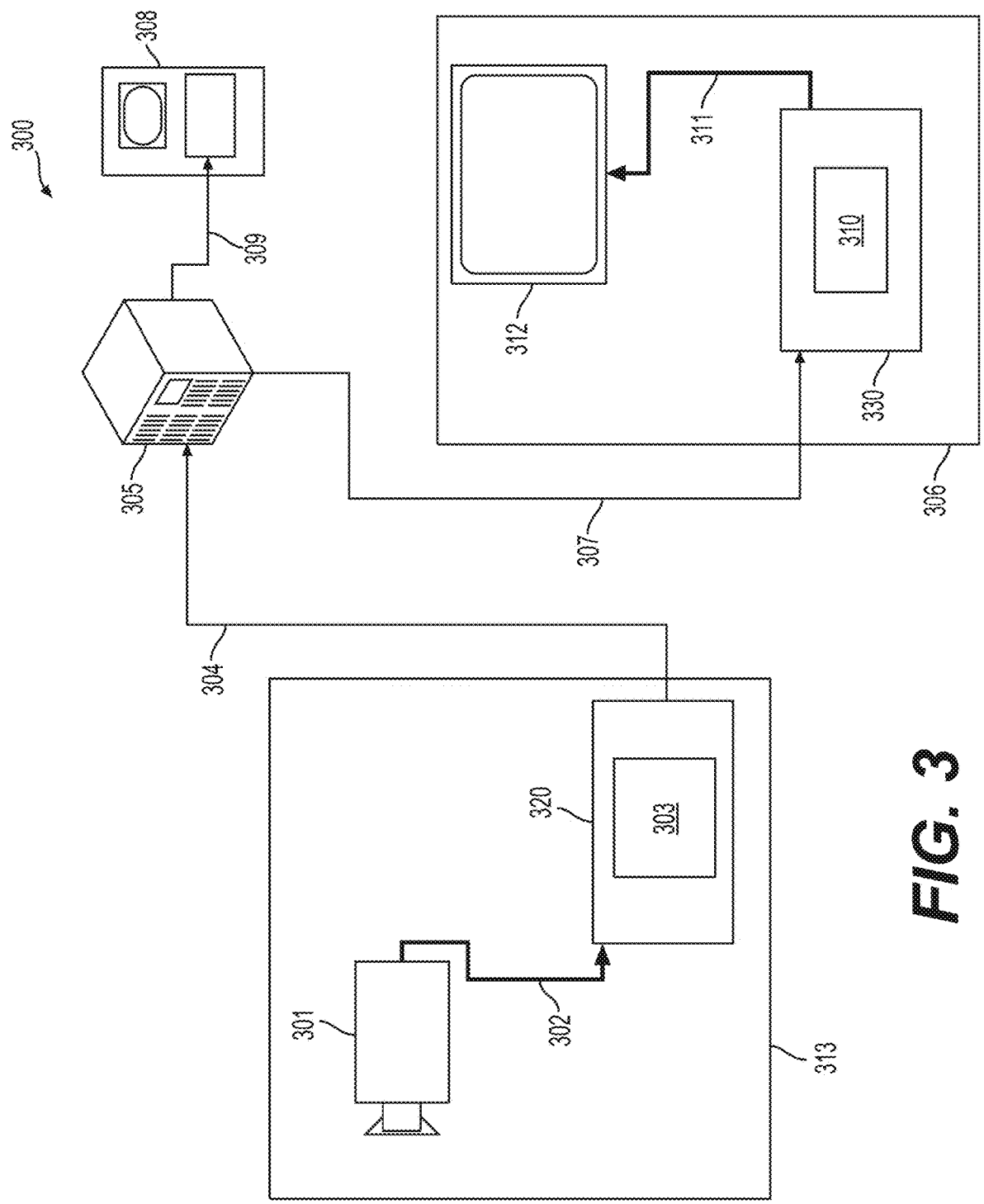
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
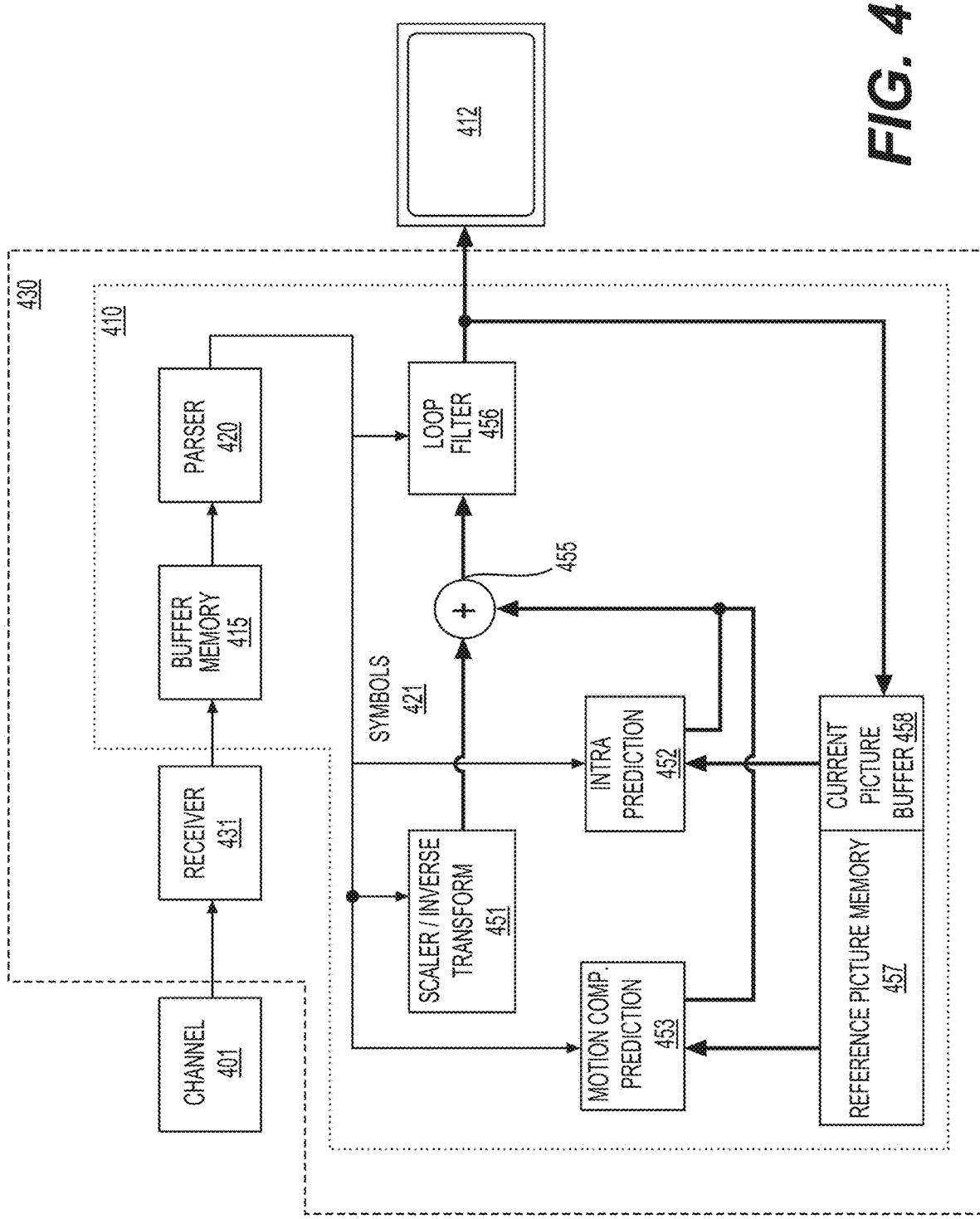
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
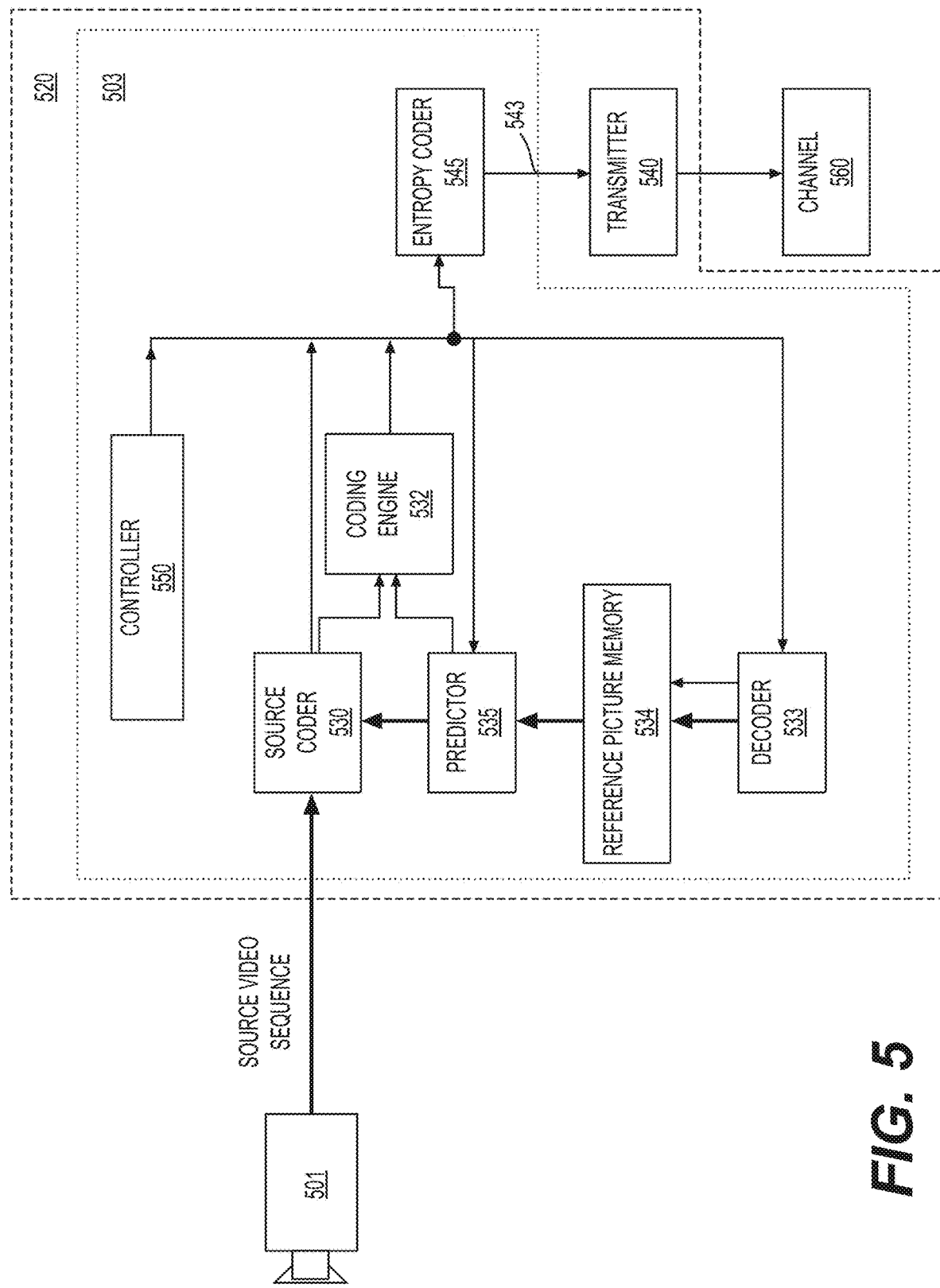
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices. SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
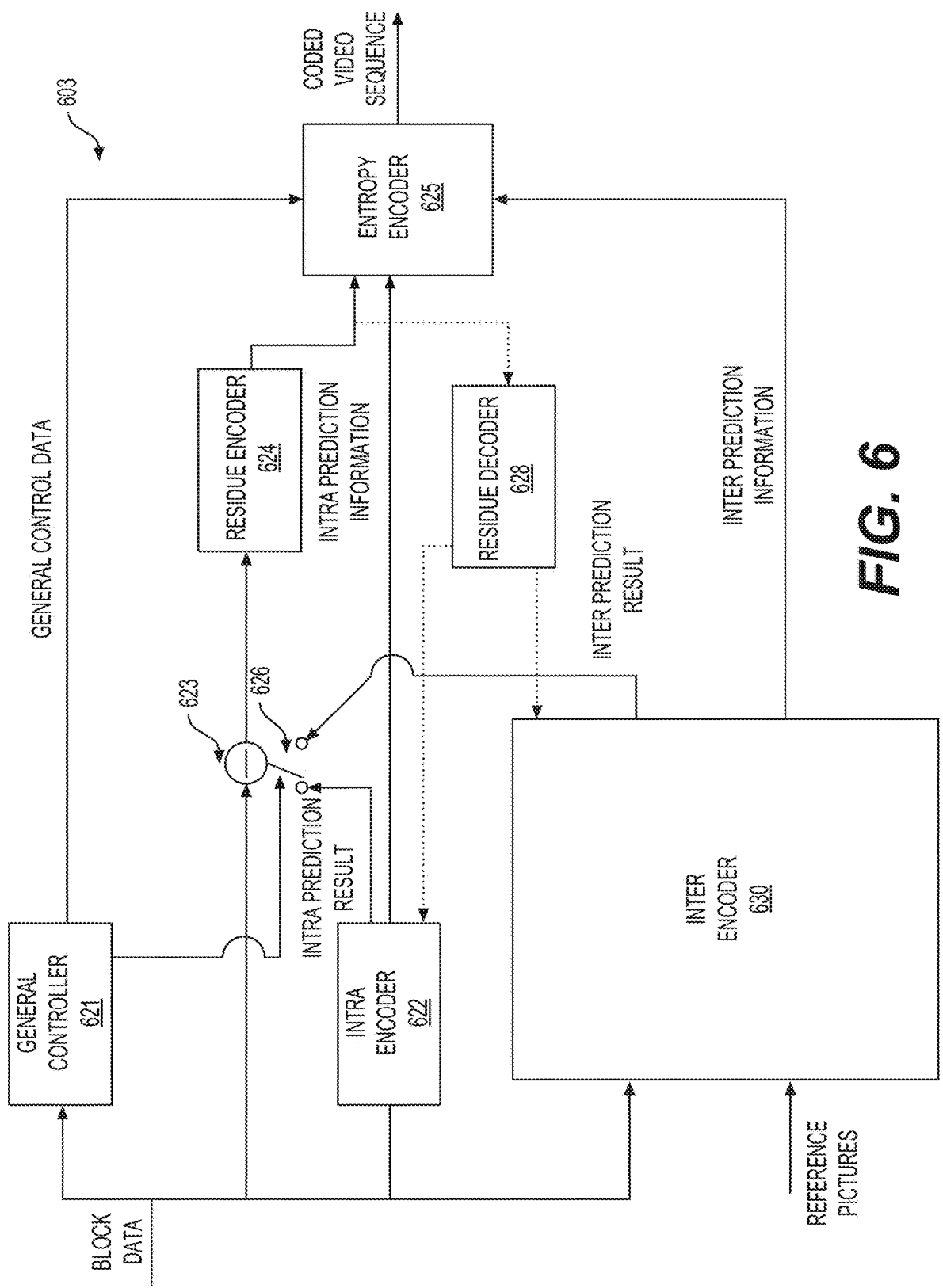
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
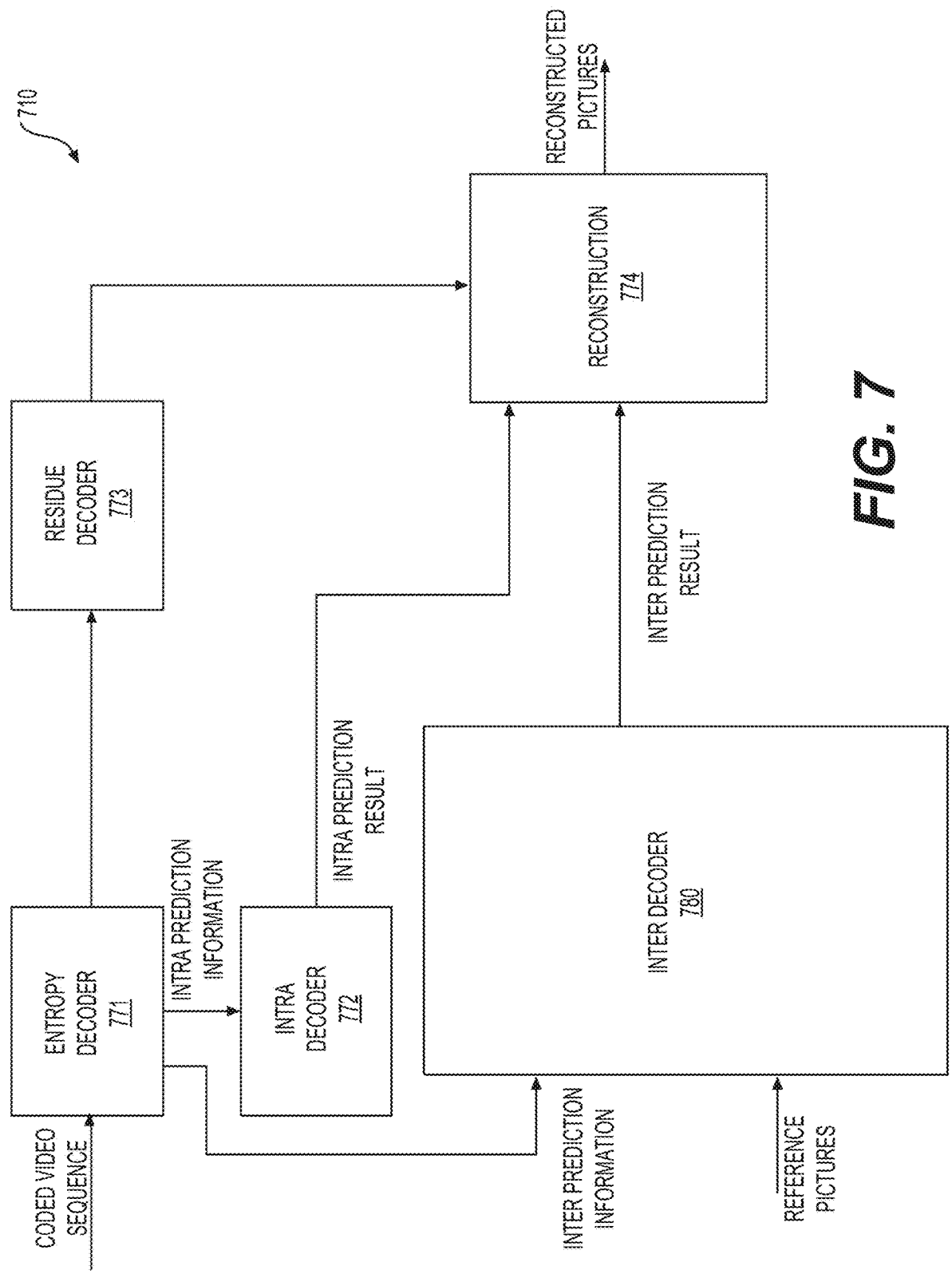
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure are directed to motion information comparison and/or motion information pruning, for example on a block or sub-block basis. The motion information can include one or more MVs and one or more reference indices for a block or sub-block. Methods and apparatuses in the disclosure can be used to reduce complexity of comparing, for example, new motion information to be added to a candidate list (e.g., a merge candidate list, a motion vector prediction (MVP) candidate list, or the like) with one or more motion information candidates (also referred to as candidates, such as merge candidates, MVP candidates, or the like) in the candidate list. Motion information can refer to motion information used in a block mode where samples in the block use the same motion information, such as merge candidates in the HEVC standard. Motion information can also refer to motion information used in a sub-block mode where multiple pieces of motion information can be used for samples in different sub-blocks in a block, and the multiple pieces of motion information can be different. The sub-block mode can be an affine mode (also referred to as an affine prediction mode) using affine motion compensation, a sub-block temporal MV prediction (SbTMVP) such as used in VVC, or the like.

In the affine mode, affine motion compensation can be used to efficiently predict motion information for samples within a block by describing a 6-parameter (or a 4-parameter) model for the block being coded (e.g., a coding block (CB)). More specifically, in the affine coded block, samples in different parts of the block can have different motion information, such as different MVs. A basic unit to have the same motion information in the affine coded block can be referred to as a sub-block where samples in the same sub-block have the same motion information. A size of a sub-block can range from 1 sample to a size of the block.

In the affine mode, for each sample in the block, corresponding motion information including a MV that is relative to a reference picture can be derived using, for example, a 6-parameter or a 4-parameter model. In order to reduce implementation complexity, affine motion compensation can be performed on a sub-block basis, instead of on each sample. Accordingly, each sub-block can derive motion information for the respective sub-block, and thus, the motion information can be identical for samples in the same sub-block. A specific location, such as a top-left or a center location, of each sub-block can be used as a representative location for the respective sub-block. In an example, a size of the sub-block is 4×4 samples. Bi-directional affine motion compensation can lead to bi-directional predicted 4×4 blocks and can significantly increase a memory bandwidth requirement.

Figure 8:
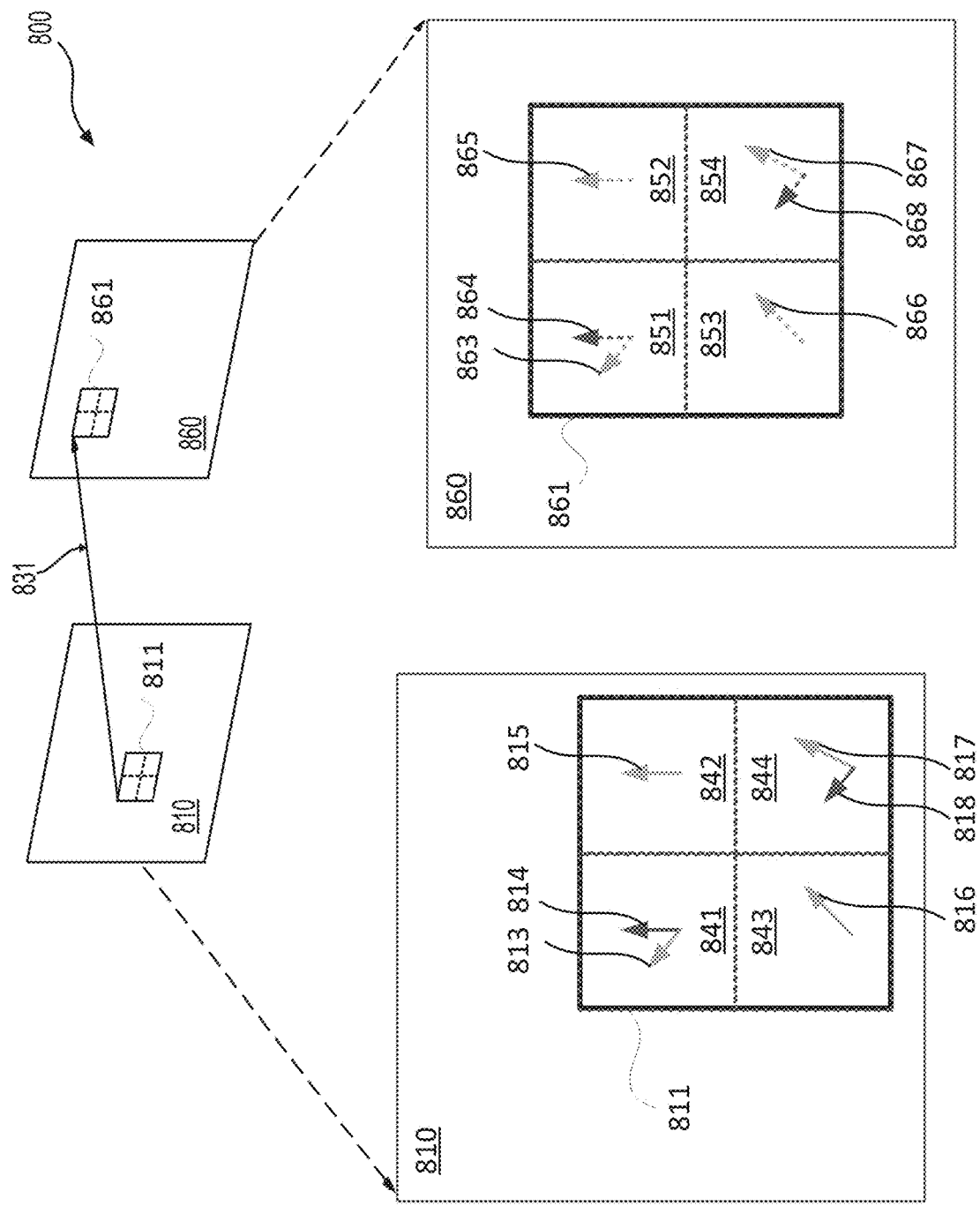
FIG. 8 shows an example of a SbTMVP mode.

FIG. 8 shows an example of the SbTMVP mode. In the SbTMVP mode, motion information in a temporal motion vector prediction (TMVP) can be modified by fetching multiple pieces of motion information from sub-blocks (851)-(854) that are smaller than a current CB (811) in a current picture (810). As shown in FIG. 8, the sub-blocks (851)-(854) are square N×N blocks. In an example, N is set to 4.

Figure 1:
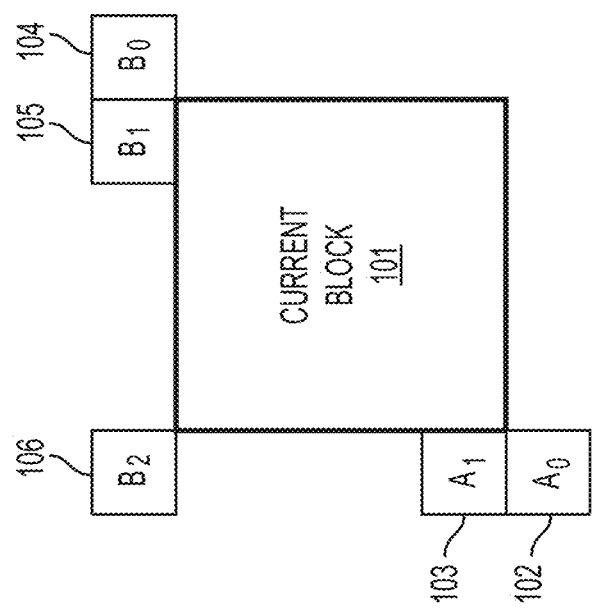
FIG. 1 is a schematic illustration of a current block and its surrounding spatial merge candidates in one example.

In an embodiment, the SbTMVP mode can be used to predict multiple pieces of motion information of sub-blocks (841)-(844) within the current CB (811) in two steps. In a first step, a corresponding block (861) in a reference picture (860) can be identified with a temporal vector (831). The reference picture (860) can also be referred to as a motion source picture (860). The reference picture (860) and the corresponding block (861) can be determined by motion information of spatial neighboring blocks of the current CB (811). For example, the spatial neighboring blocks can be from one or more of the five surrounding samples, denoted A0, A1, and B0, B1, B2 (102 through 106, respectively) as shown in FIG. 1. To avoid a repetitive scanning process of the spatial neighboring blocks, a first merge candidate in a merge candidate list of the current CB (811) can be used. For example, a first available MV and an associated reference index corresponding to the first merge candidate are set to be the temporal vector (831) and a reference index indicating the motion source picture (860). The corresponding block (861) can be identified by the temporal vector (831) in the motion source picture (860) by adding the temporal vector (831) to coordinates of the current CB (811). Accordingly, in the SbTMVP mode, the corresponding block (861) may be more accurately identified as compared with the TMVP where the corresponding block (861) (also referred to as a collocated block) is either a bottom-right or a center collocated block with respect to the current CB (811).

In a second step, the current CB (811) can be split into the sub-blocks (841)-(844). Then, the multiple pieces of motion information of the sub-blocks (841)-(844) can be obtained from the corresponding block (861). For each of the sub-blocks (841)-(844), corresponding motion information of a corresponding sub-block (e.g., a smallest grid such as a 4×4 block that covers a center sample) in the corresponding block (861) can be used to derive the motion information for the respective sub-block of the sub-blocks (841)-(844). In an example, the smallest grid is a 4×4 block, the center sample is located at (2, 2) while a top-left sample of the smallest grid is at (0, 0).

In an example, one of the sub-blocks (841)-(844) corresponds to one of sub-blocks (851)-(854) where the one of the sub-blocks (841)-(844) has a same relative position in the current CB (811) as that of the one of the sub-blocks (851)-(854) in the corresponding block (861). Referring to FIG. 8, the sub-block (841) is a top-left sub-block in the current CB (811) and corresponds to the sub-block (851) that is a top-left sub-block in the corresponding block (861). Similarly, the sub-blocks (842)-(844) correspond to the sub-blocks (852)-(854), respectively. Accordingly, the motion information of the sub-block (851) can be used to derive the motion information for the sub-block (841).

In the example shown in FIG. 8, the motion information of the sub-block (851) includes two MVs (863) and (864), and thus, the motion information of the sub-block (841) also includes two MVs, for example MVs (813) and (814), respectively. The motion information of the sub-block (852) includes a MV (865), and thus, the motion information of the sub-block (842) also includes one MV, for example MV (815). The motion information of the sub-block (853) includes a MV (866), and thus, the motion information of the sub-block (843) also includes one MV, for example MV (816). The motion information of the sub-block (854) includes two MVs (867) and (868), and thus, the motion information of the sub-block (844) also includes two MVs, for example MVs (817) and (818), respectively. In the example shown in FIG. 8, the MVs (813), (815)-(817), (863), and (865)-(867) are associated with a reference picture list 0 (also referred to as a list 0), and the MVs (814), (818), (864), and (868) are associated with a reference picture list 1 (also referred to as a list 1). In an example, the sub-blocks (841), (844), (851), and (854) are predicted using bi-prediction, and the sub-blocks (842), (843), (852), and (853) are predicted using uni-prediction. In some embodiments, each of the multiple pieces of motion information of the sub-blocks (841)-(844) can include one or more MVs as well as one or more reference indices.

In an embodiment, after the corresponding motion information (e.g., the MV (865)) of the corresponding sub-block (e.g., the sub-block (852)) is identified, the corresponding motion information (e.g., the MV (865)) can be converted to, or otherwise used to determine, one or more MVs (e.g., the MV (815)) and one or more reference indices of the respective sub-block (e.g., the sub-block (842)) in the current CB (811), similar to the TMVP mode. The conversion can include motion information scaling such as a MV scaling and other suitable procedures. For example, a decoder can check whether a low-delay condition (e.g., picture order counts (POCs) of reference pictures of the current picture (810) are smaller than a POC of the current picture (810)) is fulfilled and can use a motion vector MV0 (i.e., a MV corresponding to a reference picture list 0) to predict a motion vector MV1 (i.e., a MV corresponding to a reference picture list 1) or use the MV0 to predict the MV for each of the sub-blocks (841)-(844).

Figure 9:
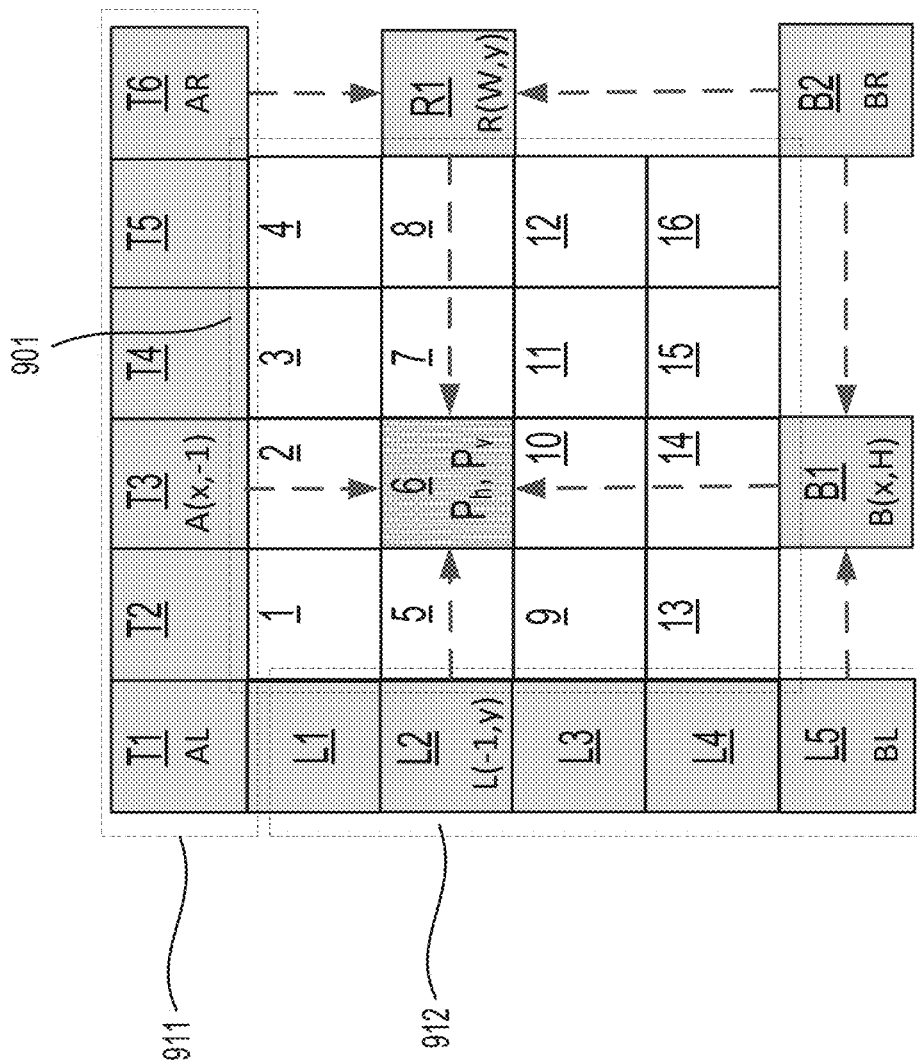
FIG. 9 shows an example of a planar MV prediction mode.

In a planar MV prediction mode (also referred to as a planar MV prediction), a planar MV candidate can be used as a special merge candidate on a sub-block basis. The planar MV prediction can be used to generate a smooth and fine granularity motion field. FIG. 9 shows examples of the planar MV prediction mode. A current block (901) includes a plurality of sub-blocks (1-16). A row (911) includes top spatial neighbors T1-T6 (also referred to as top neighbors) of the current block (901). Motion vectors AL, A(x, −1), AR, correspond to the top neighbors T1, T3, and T6 (also referred to as an above right spatial neighbor). A column (912) includes left spatial neighbors L1-L5 (also referred to as left neighbors) of the current block (901). Motion vectors L(−1, y) and BL correspond to the left neighbors L2 and L5 (also referred to as a bottom left spatial neighbor). A motion vector BR, is a MV of a bottom right temporal neighbor B2 of the current block (901). The current block (901) has a width W and a height H. In an example, the sub-blocks (1)-(16), the spatial neighbors T1-T6, L1-L5, and the bottom right temporal neighbor B2 have a size of 4×4 samples. In addition, R1 is a right neighbor and B1 is a bottom neighbor of the current block (901) corresponding to motion vectors R(W, y) and B(x, H), respectively.

In an example, a top-left sample of the current block (901) has a position (0, 0) and the sub-block (6) that has a position (x, y). The top neighbor T3, the sub-block (6), and the bottom neighbor B1 are in a same column x. The left neighbor L2, the sub-block (6), and the right neighbor R1 are in a same row y. As an example, a planar MV prediction is applied to the sub-block (6) as follows.

A horizontal prediction $P_h(x, y)$ for the sub-block (6) at the position (x, y) in the current block (901) can be calculated via a linear interpolation on a 4×4 block basis, such as shown in equation (1).

$$P_h(x,y)=(W-1-x) \times L(-1,y)+(x+1) \times R(W,y) \qquad \text{equation (1)}$$

where L(−1, y) and R(W, y) are the MVs of the 4×4 blocks (e.g., L2 and R1) to the left and right of the current block (901). A vertical prediction $P_v(x, y)$ for the sub-block (6) can be calculated via a linear interpolation on a 4×4 block basis, such as shown in equation (2).

$$P_v(x,y)=(H-1-y) \times A(x,-1)+(y+1) \times B(x,H) \qquad \text{equation (2)}$$

where A(x, −1) and B(x, H) are the MVs of the 4×4 blocks (e.g., T3 and B1) above and below of the current block (901).

Further, the planar MV prediction can be achieved by averaging the horizontal prediction $P_h(x, y)$ and the vertical prediction $P_v(x, y)$ to determine a planar MV P(x, y), as shown in equation (3).

$$P(x,y)=(H \times P_h(x,y)+W \times P_v(x,y)+H \times W)/(2 \times H \times W) \qquad \text{equation (3)}$$

In an embodiment, the sub-block (6) is decoded prior to the right neighbor R1 and the bottom neighbor B1, and thus, the respective MVs, R(W, y) and B(x, H) of the right neighbor R1 and the bottom neighbor B1 can be derived, for example, using equations (4) and (5).

$$R(W,y)=((H-y-1)*AR+(y+1)*BR)/H \qquad \text{equation (4)}$$

$$B(x,H)=((W-x-1)*BL+(x+1)*BR)/W \qquad \text{equation (5)}$$

where the MVs, AR, BR, and BL, are already determined. Equation (4) shows that R(W, y) of the right neighbor R1 can be computed using the derived BR of the bottom right neighbor B2 along with the AR of the above right neighbor T6. Equation (5) shows that the MV B(x, H) of the bottom neighbor B1 can be computed using the derived BR of the bottom right neighbor B2 along with the BL of the bottom left neighbor L5.

When adding a new piece of motion information to a candidate list (e.g., a merge candidate list, a MVP candidate list, or the like), the new piece of motion information is compared with existing candidates (e.g., MV candidates or MVP candidates) in the candidate list. For purposes of brevity, merge candidates and MVP candidates can be referred to as motion information candidates or candidates, and a merge candidate list and a MVP candidate list can be referred to as a candidate list. The motion information and/or candidate can include one or more MV values and other related information, such as one or more reference picture number information (e.g., a reference index), prediction mode information (e.g., the affine mode, the SbTMVP mode), local illumination compensation information (e.g., a local illumination compensation (LIC) flag), generalized bi-prediction (GBi) weights, and/or the like.

When the new piece of motion information is different from the existing candidate(s) included in the candidate list in one or more aspects, the new piece of motion information can be added into the candidate list as a new candidate. For example, when a new MV value is different from the MV values of the existing candidates, or when a new reference index is different from the reference indices of the existing candidates or the like, the new piece of motion information is added into the candidate list.

A comparison can be performed to prune, or otherwise avoid, duplicate candidates in the candidate list, and thus the above process can be referred to as candidate pruning. In an embodiment, full pruning is used where a new piece of motion information is compared with all the candidates in the candidate list. In an embodiment, a partial pruning is used where a new piece of motion information is compared with a selected subset of all the candidates in the candidate list.

In an embodiment, in the sub-block mode, such as the affine mode and the SbTMVP mode, a block is divided into a plurality of sub-blocks and motion information of the block includes multiple pieces of motion information for the respective sub-blocks. Accordingly, the block can be referred to as a sub-block based block. Similarly, for a candidate in a candidate list, the candidate (e.g., a MVP candidate) can be referred to as a sub-block based candidate when the candidate is associated with another block that includes a plurality of sub-blocks and motion information of the other block includes multiple pieces of motion information for the sub-blocks in the other block. In an example, when comparing the motion information of the sub-block based block with the sub-block based candidate in the candidate list, each of the multiple pieces of motion information of the sub-blocks in the block is compared with the corresponding one of the multiple pieces of motion information of the sub-blocks in the other block.

For example, when the multiple pieces of motion information of the sub-blocks of the block match the multiple pieces of motion information of the sub-blocks in the other block associated with the candidate, the motion information of the block and the candidate are considered identical and the motion information of the block can be pruned or excluded from the candidate list.

However, complexity of candidate pruning can increase when a candidate list includes a large number of candidates or includes motion information for a large number of sub-blocks (e.g., when one or more of the candidates are sub-block based candidates).

In one embodiment, when coding a current block in an inter prediction mode, a candidate list including candidates for the current block can be constructed. Prior to adding new motion information of a previously coded block to the candidate list that includes one or more candidates, in order to reduce complexity of the candidate pruning, according to embodiments of the disclosure, at least one hash value can be calculated based on the new motion information. Then, whether the new motion information is different from the one or more candidates in the candidate list for the current block can be determined based on the at least one hash value of the previously coded block and at least one hash value of each of the one or more candidates. Further, when the new motion information is different from the one or more candidates, the new motion information is added to the candidate list as a new candidate. In addition, at least one sample of the current block can be coded based on current motion information of the current block that is determined based on the candidate list. When the new motion information is identical, or otherwise determined to match, to one of the one or more candidates, the new motion information can be excluded or pruned from the candidate list. Therefore, instead of directly comparing the new motion information with the one or more candidates, the hash values associated with the new motion information and the one or more candidates are calculated and the pruning is performed based on the hash values, and thus, the complexity of the candidate pruning can be reduced.

In an embodiment, the new motion information is determined to be different from the one or more candidates when the at least one hash value of the previously coded block is different from the at least one hash value of each of the one or more candidates. Further, when the at least one hash value of the previously coded block is different from the at least one hash value of each of the one or more candidates, the new motion information is added to the candidate list as a new candidate.

The new motion information can include one or more motion information components and accordingly, the at least one hash value may be determined based on, but is not limited to, the one or more motion information components as follows: at least one MV (e.g., a x component MVx and/or a y component MVy of a MV); a clipped or quantized MV value(s) (e.g., clipped or quantized MVx and/or MVy); reference picture number information (e.g., a reference index in a reference picture list or a POC of a reference picture); prediction mode information indicating, for example, whether the previously coded block is coded in the affine mode, the SbTMVP mode, the planar MV prediction mode, or the like; prediction direction information indicating a uni-prediction using the list 0, a uni-prediction using the list 1, a bi-prediction using the list 0 and the list 1, or a multi-hypothesis using more than two reference picture lists; relative positions of sub-blocks in the previously coded block when the previously coded block includes the sub-blocks and the new motion information is sub-block based; weighting information used in a generalized bi-directional prediction mode (e.g., prediction weights or indices to the prediction weights); and/or local illumination compensation information (e.g., a LIC flag indicating LIC on/off status). The new motion information can further include any other suitable coding information that the previously coded block may be associated with or derive or use. In an example, the new motion information includes at least one MV.

When the previously coded block is coded using the affine mode, the new motion information can include MVs of control points, for example, a top-left, a top-right, and a bottom-left position of the previously coded block.

When the previously coded block is in the sub-block mode, a position of a sub-block in the previously coded block can be represented by a top-left or a center position of the sub-block. In an example, the position of the sub-block can be represented using a relative position with respect to a top-left position of the previously coded block. Further, the new motion information can include positions of the sub-blocks in the previously coded block.

In an embodiment, the previously coded block is in the block mode and the at least one hash value is one hash value. When the previously coded block is coded using uni-prediction with the list 0, the new motion information can include a MV and a reference index. Accordingly, the hash value can be determined based on a MVx and a MVy of the MV and the reference index. When the previously coded block is coded using bi-prediction with the list 0 and the list 1, the new motion information can include a first MV, a second MV, a first reference index, and a second reference index. Accordingly, the hash value can be determined based on a MV1x and a MV1y of the first MV, a MV2x and a MV2y of the second MV, the first reference index, and the second reference index.

In an embodiment, the previously coded block is in the sub-block mode and includes sub-blocks (1)-(L) where L is a positive integer. In an example, L is larger than 1. A hash value can be determined based on motion information of the sub-blocks (1)-(L). The motion information for each of the sub-blocks (1)-(L) can include one or more MVs and one or more reference indices.

Further, the motion information of each sub-block can include a position of the respective sub-block in the previously coded block, and accordingly the hash value can be determined further based on the positions of the sub-blocks (1)-(L) in the previously coded block in some embodiments. In an example in which L is 2, a first block can have a first left sub-block with a motion vector of (1, 1) and a first right sub-block with a motion vector of (−1, −1), and the first block can have a hash value $H_1$. A second block can have a second left sub-block with a motion vector of (−1, −1) and a second right sub-block with a motion vector of (1, 1), and the second block can have a hash value $H_2$. If positions of the sub-blocks in the first and second blocks are not considered when calculating the hash values $H_1$ and $H_2$, the hash values $H_1$ and $H_2$ can be identical even if the motion information of the first block is different from the motion information of the second block. However, when the positions of the sub-blocks are further considered in calculating the hash values $H_1$ and $H_2$, the hash values $H_1$ and $H_2$ can be different, and thus, can represent the motion information of the first and second blocks more accurately.

In an example, a hash value for a block (e.g., the previously coded block) that includes L sub-blocks (1)-(L) can be calculated using a pseudo code below.

```
For i = 1:N
    hash_key = hash_function (hash_key, MV_component [i]).
End
``` where each MV_component [i] corresponds to one of the motion information components described above for one of the sub-blocks (1)-(L), the hash_key represents the hash value, and the hash_function represents a hash function to calculate the hash value. The hash function can be any suitable method/algorithm to calculate the hash value, such as message-digest algorithm (MD5), CRC32C where CRC refers to cyclic redundancy check, or the like. The motion information components can include at least an MV. Further, the motion information components can include one or more reference indices, prediction mode information, prediction direction information, a relative position of the respective sub-block in the block, weighting information used in GBi, a LIC flag, and/or other suitable coding information. In an example, the motion information components include MVx, MVy, and a reference index, and thus, N is 3. The MV_components [1]-[3] correspond to the MVx, the MVy, and the reference index.

The above pseudo code can be implemented L times for all the sub-blocks (1)-(L) to obtain the hash value for the block. For example, when L is 2 and N is 3 as described above, the block includes a sub-block(1) and a sub-block(2). An initial hash value can be used as an initial hash_key, and the pseudo code can be implemented for the 3 motion information components, such as MVx, MVy, and a reference index, for the sub-block(1). Then, an intermediate hash value or hash_key is obtained. The intermediate hash value can be used as an initial hash_key for the sub-block(2), and the pseudo code can be implemented for the 3 motion information components for the sub-block(2). Then, the hash value for the block is obtained. In various examples, L is larger than 1 for a block coded in the sub-block mode. L is equal to 1 for a block coded in the block mode, as further described below.

In an embodiment, the block is coded in the block mode. In an example, the hash value of the block can be determined by setting L to 1, and the block mode can be treated as a special sub-block mode where the block includes only 1 sub-block that is identical to the block. The hash value can be calculated by performing the above pseudo code only once for the 1 sub-block or block. Alternatively, the block can be treated as if coded in the sub-block mode by dividing the block into a plurality of sub-blocks that have identical motion information. The above pseudo code can be performed repetitively for each of the plurality of sub-blocks with the identical motion information to obtain the hash value.

In the above pseudo code, for certain hash functions, the hash value remains unchanged if one motion information component equals to 0. In addition, the hash values for different MVs can be identical. For example, a first hash value H1 corresponding to a first MV (1,0) and a hash value H2 corresponding to a second MV (0,1) can be identical.

To calculate the hash value, an initial hash value can be set to, for example, a first non-zero value. In an example, the first non-zero value is a first prime number, such as 89. When a motion information component equals 0, a second non-zero value, such as a second prime number, can be used. The second prime number can be different from the first prime number. An offset may also be added to a motion information component where the motion information component can correspond to one of: a MV value (e.g., MVx and/or MVy), reference picture number information, weighting information, LIC information, prediction mode information, and/or the like. The offset may be different for different types of motion information components. For example, for a MVx, a non-zero offset, such as 79 may be used. For a MVy, another non-zero offset, such as 41 may be used. For the reference picture index, i.e., refIdx, a non-zero offset of 13 may be used. The offset can be zero, a prime number, or the like.

When generating the hash value for the coded block that includes multiple sets of motion information, for example, when the block is coded in the sub-block mode that includes a plurality of sub-blocks, a scan order of the multiple sets of motion information while generating the hash value can be predefined, such as in a raster scan order, from the list 0 to the list 1, or the like.

In an example, the block is an M×N block including the L sub-blocks (1)-(L) and each of the sub-blocks (1)-(L) has a size of, for example, 4×4 samples. A first pseudo code below can be used to calculate the hash value. The input to the pseudo code can include the new motion information of the M×N block. The output of the pseudo code can include the hash value of the M×N block.

```
hash_key = 89
for each 4×4 sub-block in the M×N block (in a raster scan order)
{
  for each reference picture list
  {
  hash_key = CRC32C (hash_key, refIdx + 13)
  hash_key = CRC32C (hash_key, MVx + 41)
  hash_key = CRC32C (hash_key, MVy + 89)
  }
}
return hash_key
``` where hash_key represents the hash value. The raster scan order is used when scanning the sub-blocks (I)-(L) to calculate the hash value. The initial hash value is set to be 89 that is a prime number. For one of the sub-blocks (1)-(L), when more than one reference picture list are used, the more than one reference picture list can be scanned, for example, from the list 0 to the list 1. Further, CRC32C is used as an exemplary hash function to calculate the hash value. 3 motion information components are used, i.e., a reference index (refIdx), a x component of a MV (MVx), and a y component of the MV (MVy). Different offsets are added to the 3 motion information components, respectively: a first offset of 13 is added to the reference index; a second offset of 41 is added to the MVx, and a third offset of 89 is added to the MVy. Therefore, the hash value can change even if the corresponding motion information component equals to 0. In addition, the hash value for different MVs can be different. For example, a hash value $H_1$ corresponding to a first MV (1,0) and a hash value $H_2$ corresponding to a second MV (0,1) can be different. When motion information of one of the sub-blocks (1)-(L) is invalid (e.g., a motion vector is invalid), a reference index, a x component of the MV, and a y component of the MV can be set to −1, 0, 0, respectively, or other predetermined values.

Other procedures can be used to calculate the hash value. The procedure can be suitably adapted or simplified when certain constraints are met. For example, if reference indices of a reference picture list are constrained to be the same for all the sub-blocks (1)-(L) in the M×N block, the hash value may be calculated as follows using a second pseudo code that is adjusted from the first pseudo code. The input to the pseudo code can include the new motion information of the M×N block. The output of the pseudo code can include the hash value of the M×N block.

```
hash_key = 89
for each reference picture list
{
  hash_key = CRC32C(hash_key, refIdx + 13)
  for each 4×4 sub-block in the M×N block (in the raster scan order)
  {
    hash_key = CRC32C(hash_key, MVx + 41)
    hash_key = CRC32C(hash_key, MVy + 89)
  }
}
return hash_key
```

In the second pseudo code, the reference index can be taken into consideration outside a loop for the sub-blocks (1)-(L) because the reference indices are identical for all the sub-blocks (1)-(L), thus, making the calculation more efficient.

In an embodiment of a sub-block to sub-block comparison, the previously coded block is a first coding block including first sub-blocks and is coded in the sub-block mode. The new motion information includes first multiple pieces of motion information for the first sub-blocks. As described above, a first hash value for the previously coded block can be calculated based on the first multiple pieces of motion information where the at least one hash value of the previously decoded block is the first hash value. Further, one of the one or more candidates includes second multiple pieces of motion information for second sub-blocks in a second coding block. The at least one hash value of the one of the one or more candidates is a second hash value of the second multiple pieces of motion information. Accordingly, determining whether the new motion information is different from the one or more candidates further includes determining whether the first multiple pieces of motion information are different from the second multiple pieces of motion information based on the first hash value and the second hash value. Instead of comparing the first multiple pieces of motion information directly with the second multiple pieces of motion information, the first hash value is generated and compared with the second hash value, and thus, reducing the complexity of the candidate pruning.

In an embodiment of a block to sub-block comparison, the previously coded block is a first coding block coded in the block mode and is to be compared with one of the one or more candidates coded in the sub-block mode. The one of the one or more candidates includes second multiple pieces of motion information for second sub-blocks in a second coding block and has a second hash value that is calculated based on the second multiple pieces of motion information, for example, using one of the pseudo codes described above. In an example, the first coding block is divided into a plurality of sub-blocks that have first multiple pieces of motion information that are identical to the new motion information. A first hash value for the previously coded block can be calculated based on the first multiple pieces of motion information. Accordingly, determining whether the new motion information is different from the one or more candidates further includes determining whether the first multiple pieces of motion information are different from the second multiple pieces of motion information based on the first hash value and the second hash value. The above description can be suitably adapted when the, the previously coded block is a first coding block coded in the sub-block mode and is to be compared with one of the one or more candidates coded in the block mode.

In an embodiment of a block to block comparison, the previously coded block is a first coding block coded in the block mode and is to be compared with one of the one or more candidates that is associated with a second block coded in the block mode. In an example, a first hash value for the previously coded block can be calculated. In one embodiment, the previously coded block is calculated by treating the previously coded block in a special sub-block mode where the previously coded block only includes 1 sub-block, as described above. Similarly, a second hash value for the one of the one or more candidates can be calculated, for example, by treating the second block in the special sub-block mode where the second block only includes 1 sub-block. Alternatively, the first coding block is divided into a plurality of sub-blocks that have first multiple pieces of motion information that are identical to the new motion information. The first hash value for the previously coded block can be calculated based on the first multiple pieces of motion information. Similarly, the second block is divided into a plurality of sub-blocks that have second multiple pieces of motion information that are identical to the one of the one or more candidates. The second hash value for the second block can be calculated based on the second multiple pieces of motion information. Accordingly, determining whether the new motion information is different from the one or more candidates is based on the first hash value and the second hash value.

Dividing blocks into sub-blocks in the block to block based comparison, or in a block to sub-block based comparison, can eliminate the need to determine what kind of comparison (such as a sub-block to sub-block comparison, a block to sub-block comparison, a block to block comparison, or the like) is required. In the above embodiments, the sub-block mode can be the affine mode, the SbTMVP mode, or the like.

In an embodiment, the previously coded block is coded in the affine mode and includes first control points having first multiple pieces of motion information. One of the one or more candidates corresponds to a second coding block coded in the affine mode and having second control points. The second control points have second multiple pieces of motion information. The at least one hash value of the one of the one or more candidates includes second hash values. A number of the first control points is equal to a number of the second control points. Accordingly, first hash values for the first control points can be calculated, respectively, where the at least one hash value for the previously coded block includes the first hash values. Further, determining whether the new motion information of the previously coded block is different from the one of the one or more candidates includes determining whether the first multiple pieces of motion information are different from the second multiple pieces of motion information based on the first hash values and the second hash values. In an example, the first and second control points correspond to a top-left, a top-right, and a bottom-left position of the previously coded block and the second coding block, respectively.

Figure 10:
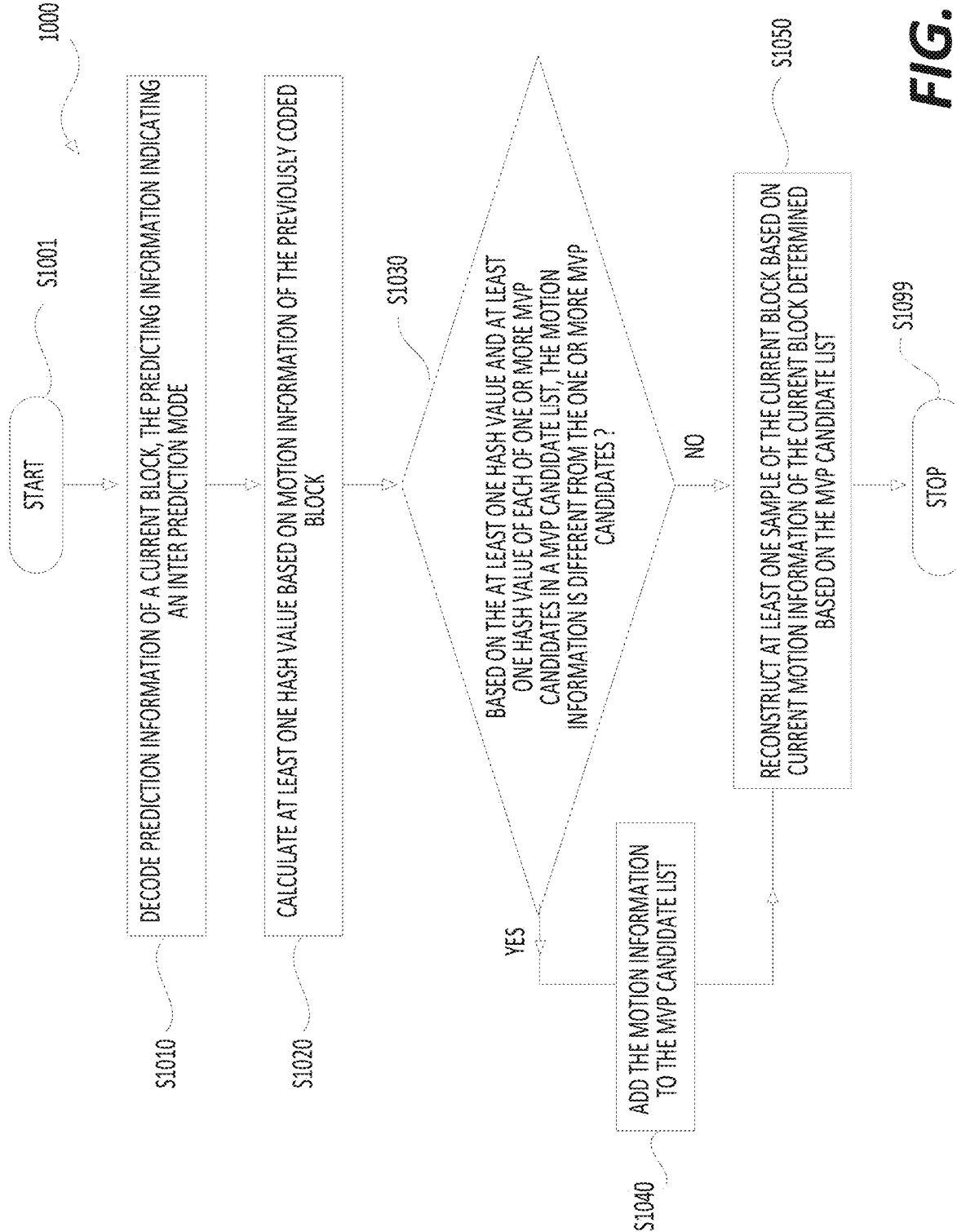
FIG. 10 shows a flow chart outlining a process (1000) according to an embodiment of the disclosure.

FIG. 10 shows a flow chart outlining a process (1000) according to an embodiment of the disclosure. The process (1000) can be used in the reconstruction of a current block coded in an inter prediction mode. In various embodiments, the process (1000) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1000) is implemented in software instructions, thus when the processing circuitry executes the software instructions, the processing circuitry performs the process (1000). The process starts at (S1001) and proceeds to (S1010).

At (S1010), prediction information of the current block is decoded from a coded video bitstream. The prediction information can indicate that the inter prediction mode is used for reconstructing the current block.

At (S1020), at least one hash value can be calculated based on motion information of a previously decoded block. The previously decoded block can be a spatial neighbor, a temporal neighbor, or the like, of the current block. In an example, the at least one hash value can be one hash value. In an example, the previously coded block is coded in the affine mode and includes first control points having first multiple pieces of motion information. Accordingly, first hash values for the first control points can be calculated where the at least one hash value for the previously coded block includes the first hash values.

At (S1030), whether the motion information of the previously decoded block is different from one or more candidates in a candidate list for the current block can be determined based on the at least one hash value of the previously decoded block and at least one hash value of each of the one or more candidates. In an example, all of the candidates in the candidate list correspond to a first candidate, a second candidate, and a third candidate. The one or more candidates correspond to the first candidate, the second candidate, and the third candidate. The at least one hash value of the previously decoded block can be compared with the at least one hash value of the first candidate. When the at least one hash value of the previously decoded block is different from the at least one hash value of the first candidate, the motion information is determined to be different from the one or more candidates. Alternatively, when a difference between the at least one hash value of the previously decoded block and the at least one hash value of the first candidate is greater than a threshold, the motion information is determined to be different from the one or more candidates. The threshold can be pre-determined or signaled in the coded video bitstream. The comparison can be repeated between the at least one hash value of the previously decoded block and the at least one hash value of the second and third candidate.

In an example, the one or more candidates correspond to a subset of the all of the candidates in the candidate list, for example, the one or more candidates correspond to the first candidate and the second candidate. Therefore, the comparison can be implemented for only the first and second candidate and not for the third candidate.

The step (S1030) can be adapted when the previously decoded block and the one of the one or more candidates are coded in the affine mode.

When the motion information of the previously decoded block is determined to be different from the one or more candidates, the process (1000) proceeds to (S1040). When the motion information of the previously decoded block is determined not to be different from the one or more candidates, the motion information is excluded or pruned from the candidate and the process (1000) proceeds to (S1050).

At (S1040), the motion information of the previously decoded block can be added to the candidate list as a new motion information candidate when the motion information of the previously decoded block is determined to be different from the one or more candidates. The process (1000) then proceeds to (S1050).

At (S1050), at least one sample in the current block can be reconstructed based on the current motion information of the current block that is determined based on the candidate list. The process (1000) then proceeds to (S1099), and terminates.

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
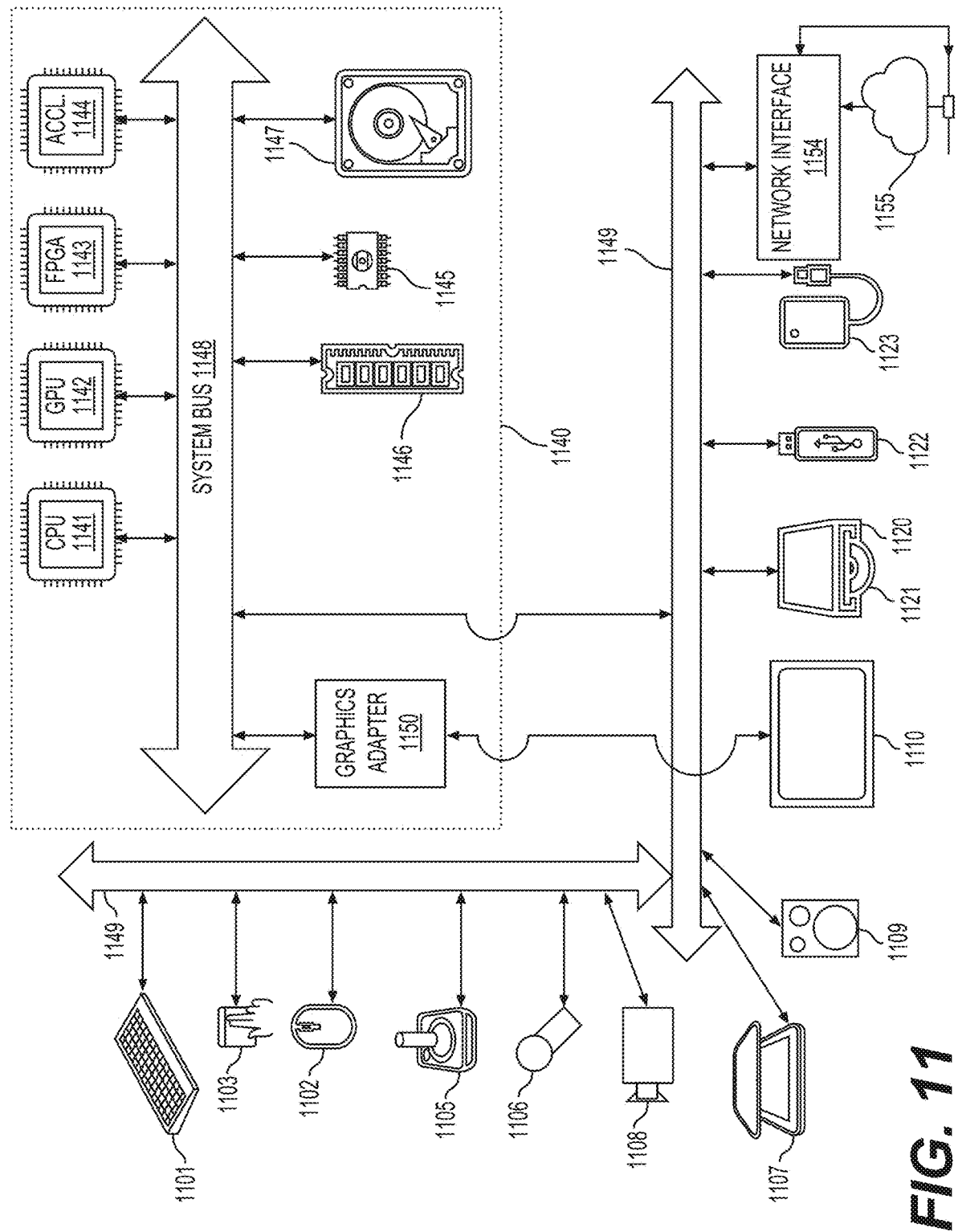
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
SbTMVP: Sub-block Temporal MV Prediction While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding prediction information of a current block to be reconstructed from a coded video bitstream, the prediction information being indicative of an inter prediction mode;
    calculating at least one hash value associated with motion information of a previously decoded block based on the motion information of the previously decoded block;
    determining whether the motion information of the previously decoded block is different from one or more motion information candidates in a candidate list for the current block based on the at least one hash value associated with the motion information of the previously decoded block and at least one hash value of each of the one or more motion information candidates;
    adding the motion information of the previously decoded block to the candidate list as a new motion information candidate when the motion information of the previously decoded block is different from the one or more motion information candidates; and
    reconstructing at least one sample of the current block based on current motion information of the current block that is determined based on the candidate list.

2. The method of claim 1, wherein the calculating the at least one hash value further comprises:
    calculating the at least one hash value associated with the motion information of the previously decoded block based on at least one motion vector in the motion information.

3. The method of claim 2, wherein the calculating the at least one hash value further comprises:
    calculating the at least one hash value associated with the motion information of the previously decoded block based on at least one of reference picture number information, weighting information used in a generalized bi-directional prediction mode, local illumination compensation information, and prediction mode information for the previously decoded block.

4. The method of claim 2, wherein
    the previously decoded block is a first coding block including first sub-blocks;
    the motion information includes first multiple pieces of motion information for the first sub-blocks; and
    the calculating the at least one hash value includes calculating a first hash value based on the first multiple pieces of motion information, the at least one hash value associated with the motion information of the previously decoded block being the first hash value.

5. The method of claim 4, wherein the first multiple pieces of motion information are identical.

6. The method of claim 4, wherein the calculating the first hash value further comprises:
    calculating the first hash value based on positions of the first sub-blocks in the previously decoded block.

7. The method of claim 3, wherein the calculating the at least one hash value further comprises:
    calculating one of the at least one hash value associated with the motion information of the previously decoded block from the motion information by at least one of:
        setting an initial hash value of the one of the at least one hash value to be a non-zero number; and
        adding an offset to a number corresponding to one of: the at least one motion vector, the reference picture number information, the weighting information, the local illumination compensation information, and the prediction mode information for the previously decoded block.

8. The method of claim 7, wherein at least one of: the non-zero number and the offset is a prime number.

9. The method of claim 4, wherein
    one of the one or more motion information candidates includes second multiple pieces of motion information for second sub-blocks in a second coding block, the at least one hash value of the one of the one or more motion information candidates being a second hash value; and
    the determining whether the motion information of the previously decoded block is different from the one or more motion information candidates further includes determining whether the first multiple pieces of motion information are different from the second multiple pieces of motion information based on the first hash value and the second hash value.

10. The method of claim 2, wherein the calculating the at least one hash value associated with the motion information of the previously decoded block comprises:
calculating a first hash value based on the motion information, the at least one hash value associated with the motion information of the previously decoded block being the first hash value.

11. The method of claim 2, wherein
the previously decoded block is coded in an affine prediction mode and includes first control points having first multiple pieces of motion information;
one of the one or more motion information candidates corresponds to a second coding block coded in the affine prediction mode and having second control points, the second control points having second multiple pieces of motion information, the at least one hash value of the one of the one or more motion information candidates including second hash values;
a number of the first control points is equal to a number of the second control points;
the calculating the at least one hash value associated with the motion information of the previously decoded block includes calculating first hash values for the first control points, respectively; and
the determining whether the motion information of the previously decoded block is different from the one or more motion information candidates includes determining whether the first multiple pieces of motion information are different from the second multiple pieces of motion information based on the first hash values and the second hash values.

12. An apparatus for video decoding, comprising processing circuitry configured to:
decode prediction information of a current block to be reconstructed from a coded video bitstream, the prediction information being indicative of an inter prediction mode;
calculate at least one hash value associated with motion information of a previously decoded block based on the motion information of the previously decoded block;
determine whether the motion information of the previously decoded block is different from one or more motion information candidates in a candidate list for the current block based on the at least one hash value associated with the motion information of the previously decoded block and at least one hash value of each of the one or more motion information candidates;
add the motion information of the previously decoded block to the candidate list as a new motion information candidate when the motion information of the previously decoded block is different from the one or more motion information candidates; and
reconstruct at least one sample of the current block based on current motion information of the current block that is determined based on the candidate list.

13. The apparatus of claim 12, wherein the processing circuitry is further configured to:
calculate the at least one hash value associated with the motion information of the previously decoded block based on at least one motion vector in the motion information.

14. The apparatus of claim 13, wherein the processing circuitry is further configured to:
calculate the at least one hash value associated with the motion information of the previously decoded block based on at least one of: reference picture number information, weighting information used in a generalized bi-directional prediction mode, local illumination compensation information, and prediction mode information for the previously decoded block.

15. The apparatus of claim 13, wherein
the previously decoded block is a first coding block including first sub-blocks;
the motion information includes first multiple pieces of motion information for the first sub-blocks; and
the processing circuitry is further configured to calculate a first hash value based on the first multiple pieces of motion information, the at least one hash value associated with the motion information of the previously decoded block being the first hash value.

16. The apparatus of claim 15, wherein the first multiple pieces of motion information are identical.

17. The apparatus of claim 14, wherein the processing circuitry is further configured to calculate one of the at least one hash value associated with the motion information of the previously decoded block from the motion information by at least one of:
setting an initial hash value of the one of the at least one hash value to be a non-zero number; and
adding an offset to a number corresponding to one of: the at least one motion vector, the reference picture number information, the weighting information, the local illumination compensation information, and the prediction mode information for the previously decoded block.

18. The apparatus of claim 15, wherein
one of the one or more motion information candidates includes second multiple pieces of motion information for second sub-blocks in a second coding block, the at least one hash value of the one of the one or more motion information candidates being a second hash value; and
the processing circuitry is further configured to determine whether the first multiple pieces of motion information are different from the second multiple pieces of motion information based on the first hash value and the second hash value.

19. The apparatus of claim 13, wherein
the previously decoded block is coded in an affine prediction mode and includes first control points having first multiple pieces of motion information;
one of the one or more motion information candidates corresponds to a second coding block coded in the affine prediction mode and having second control points, the second control points having second multiple pieces of motion information, the at least one hash value of the one of the one or more motion information candidates including second hash values;
a number of the first control points is equal to a number of the second control points; and
the processing circuitry is further configured to:
calculate first hash values for the first control points, respectively; and
determine whether the first multiple pieces of motion information for the first control points are different from the second multiple pieces of motion information for the second control points based on the first hash values and the second hash values.

20. A non-transitory computer-readable storage medium storing a program executable by at least one processor to perform:
- decoding prediction information of a current block to be reconstructed from a coded video bitstream, the prediction information being indicative of an inter prediction mode;
- calculating at least one hash value associated with motion information of a previously decoded block based on the motion information of the previously decoded block;
- determining whether the motion information of the previously decoded block is different from one or more motion information candidates in a candidate list for the current block based on the at least one hash value associated with the motion information of the previously decoded block and at least one hash value of each of the one or more motion information candidates;
- adding the motion information of the previously decoded block to the candidate list as a new motion information candidate when the motion information of the previously decoded block is different from the one or more motion information candidates; and
- reconstructing at least one sample of the current block based on current motion information of the current block that is determined based on the candidate list.

* * * * *